US006603094B2

(12) United States Patent
Miller

(10) Patent No.: US 6,603,094 B2
(45) Date of Patent: Aug. 5, 2003

(54) LASER WIRE STRIPPER APPARATUS AND METHOD THEREFOR

(75) Inventor: Richard T. Miller, Phoenix, AZ (US)

(73) Assignee: Spectrum Technology, Inc., Phoenix, AZ (US)

( * ) Notice: Subject to any disclaimer, the term of this patent is extended or adjusted under 35 U.S.C. 154(b) by 0 days.

(21) Appl. No.: 09/902,431

(22) Filed: Jul. 9, 2001

(65) Prior Publication Data

US 2003/0006219 A1 Jan. 9, 2003

(51) Int. Cl.[7] .................. B23K 26/00; B23K 26/14; B23K 26/16; B23K 26/18
(52) U.S. Cl. .................. 219/121.68; 219/121.8; 219/121.67; 219/121.69
(58) Field of Search .................. 219/121.68, 121.8, 219/121.67, 121.69, 121.73, 121.74, 121.75, 121.78, 121.79, 121.83, 121.85

(56) References Cited

U.S. PATENT DOCUMENTS

| 3,241,407 A | * | 3/1966 | Oehlerking | 81/9.51 |
| 3,285,103 A | * | 11/1966 | Oehlerking | 81/9.51 |
| 3,953,706 A | * | 4/1976 | Harris et al. | 219/121 L |
| 4,761,535 A | * | 8/1988 | Lawson | 219/121.68 |
| 4,970,367 A | * | 11/1990 | Miller | 219/121.68 |
| 5,140,873 A | * | 8/1992 | Schwartzman | 81/9.43 |
| 5,837,961 A | * | 11/1998 | Miller | 219/121.68 |

* cited by examiner

Primary Examiner—M. Alexandra Elve
(74) Attorney, Agent, or Firm—Jeffrey D. Moy; Harry M. Weiss; Weiss, Moy & Harris, P.C.

(57) ABSTRACT

An assembly for use in a laser wire stripping apparatus that has a single piece channel assembly which has a pathway for allowing a light source to travel through the channel assembly to a cylindrical cavity in the channel assembly. A collet is provided and has a passageway for insertion of a wire. The collet has an opening, which when the collet is properly inserted into the cylindrical cavity, is in alignment with the pathway thereby allowing the light source to travel to the wire in order to remove insulation from the wire. A housing assembly is used for holding the channel assembly and for allowing the channel assembly to rotate within the housing assembly. The housing assembly has an air insertion opening and an exhaust opening for clearing smoke and debris from the channel assembly.

26 Claims, 4 Drawing Sheets

LASER WIRE STRIPPER APPARATUS AND METHOD THEREFOR

BACKGROUND OF THE INVENTION

1. Field of the Invention

This invention relates to the field of wire stripping apparatus and methods therefor and, more specifically, to a laser wire stripping apparatus which is able to cut the insulation around large diameter wires/cables (hereinafter wire) without damaging the conductors. The laser wire stripping apparatus uses a rotary optics head assembly to focus and rotate a laser beam around the circumference of the wire. The laser wire stripping apparatus further has a positive pressure air section in the rotary optics head for keeping the optics free of smoke and particulates and to clean debris generated by laser cutting the wire.

2. Description of the Prior Art

Commercially available wire is typically covered by an insulating material. To facilitate coupling wire to an electrical connector, one must first remove a segment of the insulation from the wire. In the past, mechanical, hand operated tools were used to remove the insulation from the wire. Removing the insulation with these hand operated tools was a relatively slow and labor intensive process. Thus, these devices are inefficient for high quality stripping of large diameter wire. Furthermore, when using a hand operated mechanical wire stripping apparatus, there is a significant probability of damaging the conductors when the insulation is being removed.

Mechanical devices generally use a knife to remove the insulation from the wire. Generally, a pair of "V" knives are used to find the diameter of the wire. The "V" knives come down and crush into the wire. The "V" knives are then rotated around the circumference of the wire in order to cut the insulation. Since "V" knives are not perfectly round and since the "V" knives do not match the contour of the wire, the "V" knives have a tendency to nick and damage the conductors of the wire.

Another prior art wire stripping device consists of one or more rotary blades. The blades rotate thereby cutting the insulation when the wire is placed near the blades. While the rotary blade device is certainly faster and more efficient than a hand operated device, it still suffers from the problem of potential wire damage when removing the insulation.

Other prior art wire stripping devices have implemented lasers, as opposed to mechanical means, to cut a portion of the insulation in order to permit a user to remove a segment of the insulation from the wire. However, laser cutting systems also have several problems. First, many laser cutting systems use an X-Y positioning system. These laser cutting systems generally use a single laser which only moves in a single plane (i.e., X-Y plane). The problem with moving only in a single plane is that with large diameter wires, the ends on either side of the wire are completely out of the depth of the field of the focusing lens. Thus, the insulation on the sides of the wire may not be cut by the laser.

Another problem with present laser wire stripping apparatuses is that they do not effectively remove smoke and other particulates from the channel assembly when the insulation is being cut by the laser beam. When the laser cuts the insulation, smoke and other particulates are generated. If the smoke and other particulates are not adequately removed from the channel assembly, they will interfere with the laser beam. The interference of the smoke and particulates will cause the optical components of the wire stripping apparatus to be damaged. Further, the smoke and particulates generated by the laser stripping process will cause the wire to be significantly contaminated. The smoke generated by laser cutting the insulation may be potentially toxic. Thus, if the smoke is not properly removed from the area, the smoke may cause serious health problems to those around the apparatus.

The channel assembly through which the laser is sent is generally made of a plurality of components. The plurality of components make for a more costly apparatus and produces a less accurate cut. By simplifying the channel assembly, fewer components are required. Furthermore, fewer components will also provide for a more stable environment thereby increasing the accuracy and stability of the apparatus.

Therefore, a need existed to provide an improved wire stripping apparatus. The improved wire stripping apparatus will use a laser which is able to be focused and rotated around the entire circumference of a wire thereby providing for a more uniform cut of the insulation covering the wire. The laser wire stripping apparatus must have an exhaust system which properly removes the smoke and particulates from the apparatus. The improved laser wire stripping apparatus must be built with fewer components thereby providing for a more stable environment and a more accurate cut by the laser wire stripping apparatus.

SUMMARY OF THE INVENTION

In accordance with one embodiment of the present invention, it is an object of the present invention to provide an improved wire stripping apparatus.

It is another object of the present invention to provide an improved wire stripping apparatus that uses a laser which is able to be focused and rotate around the entire circumference of a wire thereby providing for a more uniform cut of the insulation covering the wire.

It is still another object of the present invention to provide an improved laser wire stripping apparatus that has an exhaust system which properly removes smoke and particulates from the apparatus.

It is still another object of the present invention to provide an improved laser wire stripping apparatus that is built with fewer components thereby providing for a more stable environment and a more accurate cut.

BRIEF DESCRIPTION OF THE PREFERRED EMBODIMENTS

In accordance with one embodiment of the present invention an assembly for use in a laser wire stripping apparatus is disclosed. The assembly has a single piece channel assembly which has a pathway for allowing a light source to travel through the channel assembly to a cylindrical cavity in the channel assembly. A collet is provided and has a passageway for insertion of a wire. The collet has an opening, which when the collet is properly inserted into the cylindrical cavity, is in alignment with the pathway thereby allowing the light source to travel to the wire in order to remove insulation from the wire. A housing assembly is used for holding the channel assembly and for allowing the channel assembly to rotate within the housing assembly. The housing assembly has an air insertion opening and an exhaust opening. The air insertion opening is used to pressurize optical components of the apparatus in order to keep the optical components free of contaminates and to blow debris out of a laser cut in the insulation of the wire. The exhaust opening is used for clearing smoke and debris from the channel assembly.

In accordance with another embodiment of the present invention a laser wire stripping apparatus is disclosed. The laser wire stripper has a housing. A laser generator is provided for generating a light source. A single piece channel assembly is located within the housing. The channel assembly has a pathway for allowing the light source to travel through the channel assembly to a cylindrical cavity in the channel assembly. A collet is provided and has a passageway for insertion of a wire. The collet has an opening, which when the collet is properly inserted into the cylindrical cavity, is in alignment with the pathway thereby allowing the light source to travel to the wire in order to remove insulation from the wire. A housing assembly is provided and is used for holding the channel assembly and for allowing the channel assembly to rotate within the housing assembly. The housing assembly has an air insertion opening and an exhaust opening. The air insertion opening is used to pressurize optical components of the apparatus in order to keep the optical components free of contaminates and to blow debris out of a laser cut in the insulation of the wire being cut. The exhaust opening is used for clearing smoke and debris from the channel assembly.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings, wherein like reference numerals and symbols represent like elements.

DETAILED DESCRIPTION OF THE PREFERRED EMBODIMENT

Figure 1:
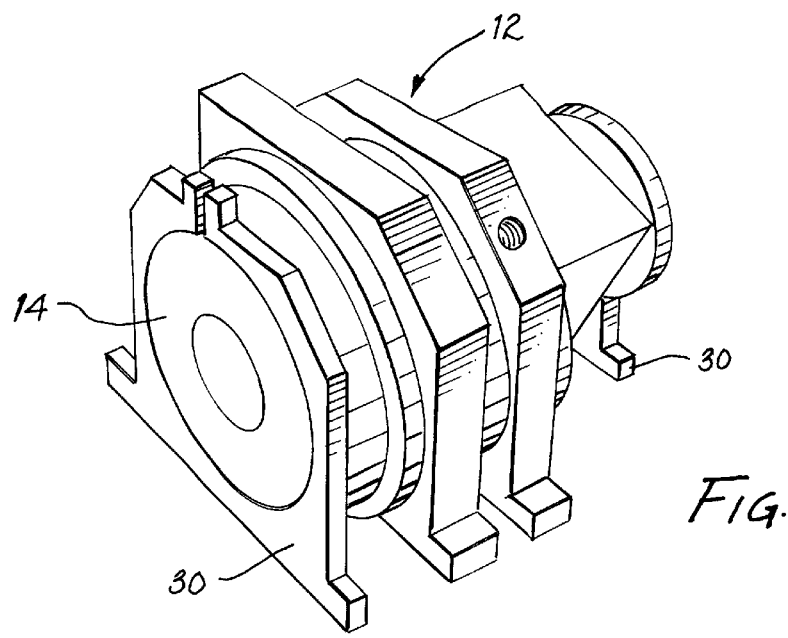
FIG. 1 is an elevated perspective view of a housing and channel assembly used in the laser wire stripping apparatus of the present invention.
Figure 2A:
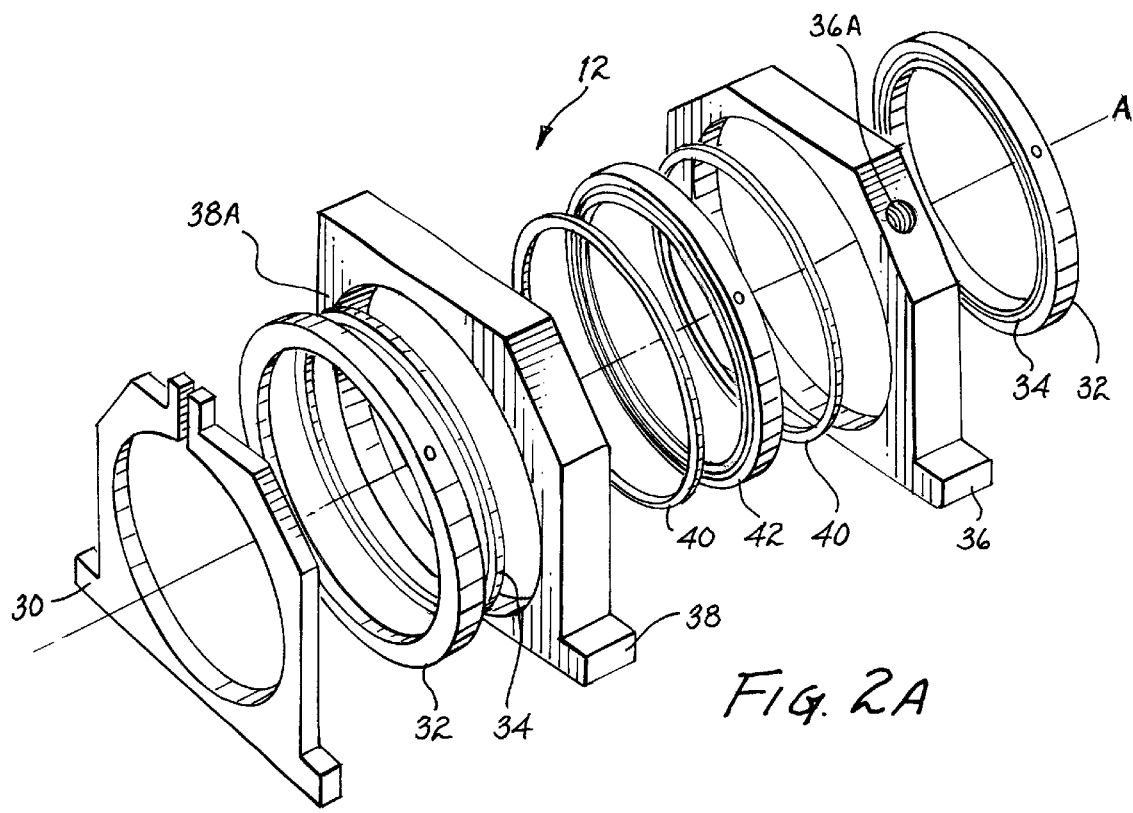
FIG. 2A is an exploded view of the housing assembly used in the laser wire stripping apparatus of the present invention.
Figure 2B:
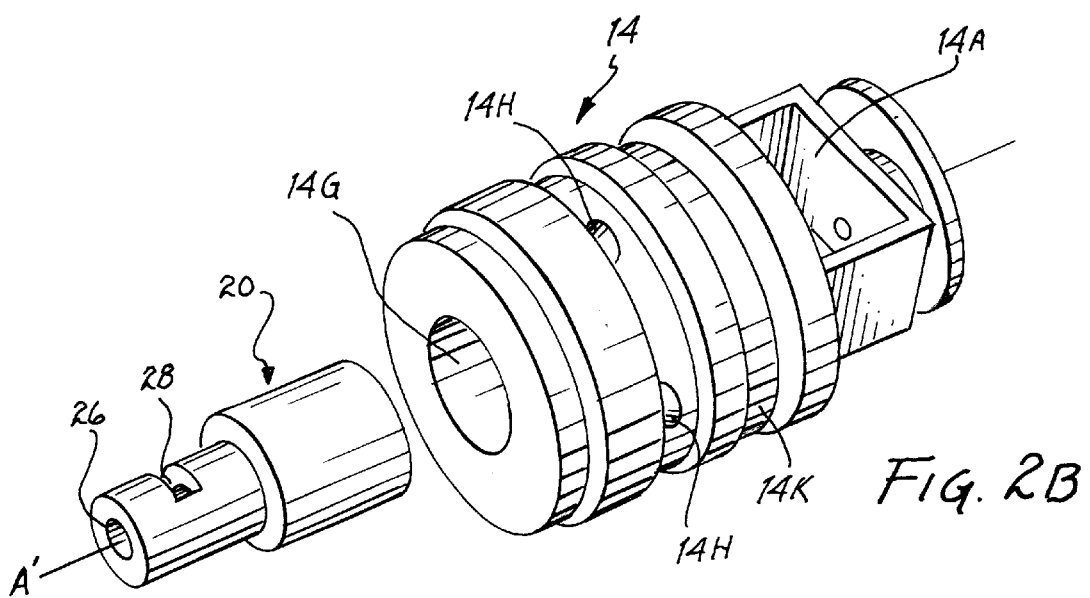
FIG. 2B is an exploded view of the channel assembly used in the laser wire stripping apparatus of the present invention.
Figure 3:
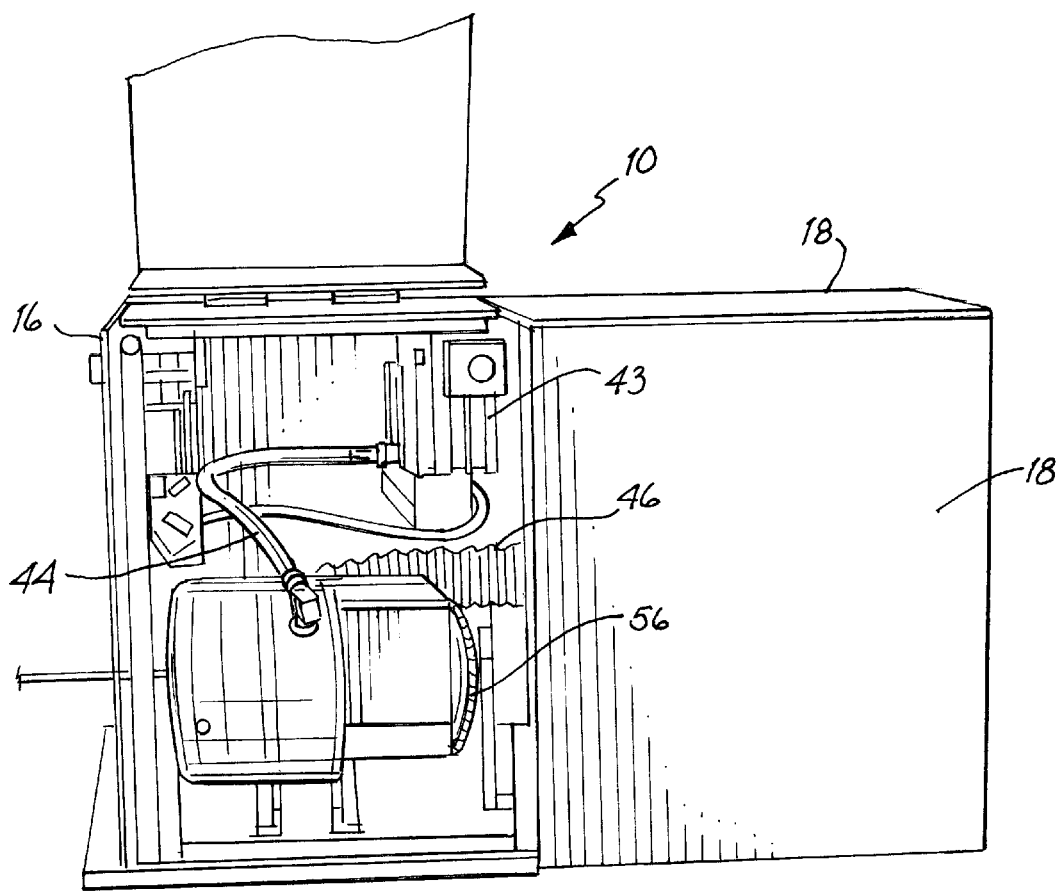
FIG. 3 is a side view showing an interior section of the laser wire stripping apparatus of the present invention.

Referring to the Figures, a laser wire stripping apparatus 10 (hereinafter wire stripper 10) is shown. The wire stripper 10 is able to cut the insulation around large diameter wires/cables (hereinafter wire) without damaging the conductors. The wire stripper 10 uses a rotary optics head assembly to focus and rotate a light source such as a laser beam around the circumference of the wire. By rotating the light source, the wire stripper 10 is able to provide a uniform cut around the entire circumference of the wire. The wire stripper 10 further has a positive pressure gas section in the rotary optics head for keeping the optics free of smoke and particulates and to clean debris generated by laser cutting the wire.

The wire stripper 10 has a frame 16 which is used for holding and supporting the interior section of the wire stripper 10. A plurality of wall sections 18 are coupled to the frame 16 to cover and protect the interior section of the wire stripper 10 from the environment.

Within the interior section is a channel assembly 14. The channel assembly 14 is made from a single machined piece of material. In general, the channel assembly 14 is made from a hard and durable metal. By having the channel assembly 14 formed from a single machined piece of material, the channel assembly 14 is simplified when compared to prior art devices. Furthermore, by simplifying the channel assembly 14, the wire stripper 10 will have a more stable environment thereby increasing the accuracy and stability of the wire stripper .10.

The channel assembly 14 is machined so that there is a rectangular void 14A within the channel assembly 14. A pair of openings 14B are drilled through a side wall section of the rectangular void 14A. The openings 14B are drilled so that a passage way is formed into and out of the rectangular void 14A.

Mirrors 14C are coupled to an interior section of the rectangular void 14A. The mirrors 14C are coupled and positioned so that when a light source such as a laser beam enters the interior section of the rectangular void 14A through one of the openings 14B, the light source is reflected off of the mirrors 14C and out of the rectangular void 14A through the other opening 14B.

A passage way 14D is also machined within the channel assembly 14. The passage way 14D is machined along a path parallel to the length of the channel assembly 14. The passage way 14D extends from the openings 14B through which the light source will exit the rectangular void 14A, along a majority of the length of the channel assembly 14, to an end of the channel assembly 14 opposite of the rectangular void. However, it should be noted that the passage way 14D does not extend through the end of the channel assembly 14.

Located within the passage way 14D is a lens 14J. The lens 14J is able to slide within the passage way 14D. By moving the lens 14J within the passage way 14D, one is able to focus the light source which travels through the passage way 14D. By properly focusing the light source, one is able to have a light source which has the proper intensity and energy density to accurately cut the insulation from the wire without damaging the conductors in the wire.

At the end of the passage way 14D opposite from the opening 14B is a mirror 14E. The mirror 14E is positioned in the passage way 14D to reflect the focused light source down a second passageway 14F which is milled in the channel assembly 14. The second passageway 14F connects the first passageway 14D with a cylindrical cavity 14G which is machined in the channel assembly. The cylindrical cavity 14G is centrally located along the width of the channel assembly 14. The cylindrical cavity 14G is milled so that it extends through an end opposite from the rectangular void 14A and approximately half way along the length of the channel assembly 14.

The channel assembly 14 has a plurality of ventilation passageways 14H. The ventilation passageways 14H are drilled along the outer circumference of the channel assembly 14. The ventilation passageways 14H are drilled from the outside surface of the channel assembly 14 and into the cylindrical cavity 14G. The ventilation passageway s 14H will allow smoke and other particulates to be removed from the cylindrical cavity 14G when the wire stripper 10 is in use.

The channel assembly 14 also has a gas intake passageway 14I. The gas intake passageway 14I is also drilled from the outside surface of the channel assembly 14 and into the cylindrical cavity 14G. The gas intake passageway 14I is used to inject a gas into the cylindrical cavity 14. The gas may be air, oxygen, dry nitrogen and the like. It should be noted that the above gases are given just as examples and should not be seen as to limit the scope of the present invention. By inserting a clean gas into the channel assembly 14, the gas will pressurize the optical components (i.e., mirror 14E, and lens 14J) thereby keeping the optical components free of contaminants. The gas will further blow any debris from the cutting area of the wire. The operation of the gas intake passage way 14I and the ventilation passageways 14H will be described in more detail below.

The cylindrical cavity 14G is used to hold a collet 20. The collet 20 is also machined from a single piece of material, generally a hard durable piece of metal. The collet 20 is cylindrical in shape. In the embodiment depicted in the Figures, the collet 20 has a first section 22 and a second section 24. The diameter of the first section 22 is approximately equal to the diameter of the cylindrical cavity 14G. This will allow the collet 20 to fit securely in the cylindrical cavity 14G when inserted. The collet 20 has a smaller width second section 24. The smaller second section 24 extends out of the cylindrical cavity 14G when inserted. It should be noted that the Figures depict one embodiment of the collet 20. The collet 20 may be machined so as to have a uniform thickness.

A passageway 26 is formed along a centrally located axis along the length of the collet 20. The passage way 26 is drilled through a first end of the collet 20 and extends along a majority of the length of the collet 20. The passageway 26 is where a wire (not shown) is inserted when the insulation needs to be cut by the light source for removal. The diameter of the passageway 26 will depend on the diameter of the wire that is inserted into the wire stripper 10. Thus, collets 20 having different size diameter openings for the passageway 26 are used with the wire stripper 10. The particular collet 20 used will depend on the diameter of the wire that is being inserted into the passageway 26.

An opening 28 is formed on a top surface of the collet 20. The opening 28 extends from the top surface through the collet 20 into the passageway 26. When the collet 20 is properly inserted into the cylindrical cavity 14G of the channel assembly 14, the opening 28 is in alignment with the second passageway 14F. This will allow the light source to travel through the channel assembly 14 into the collet 20 where the light source will cut the insulation from the wire that is inserted into the collet 20.

Figure 4:
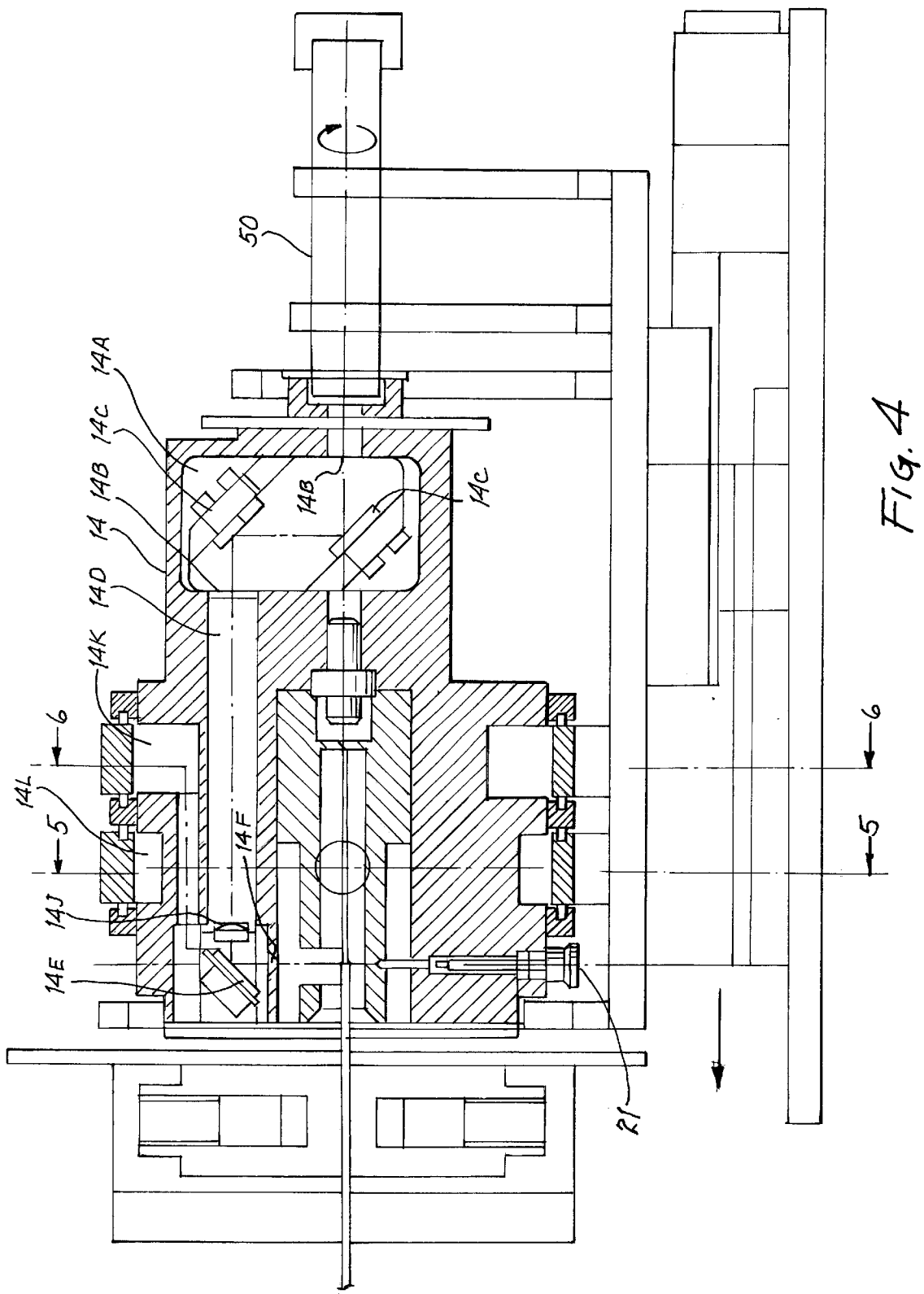
FIG. 4 is a cross-sectional side view of the laser wire stripping apparatus of the present invention.
Figure 5:
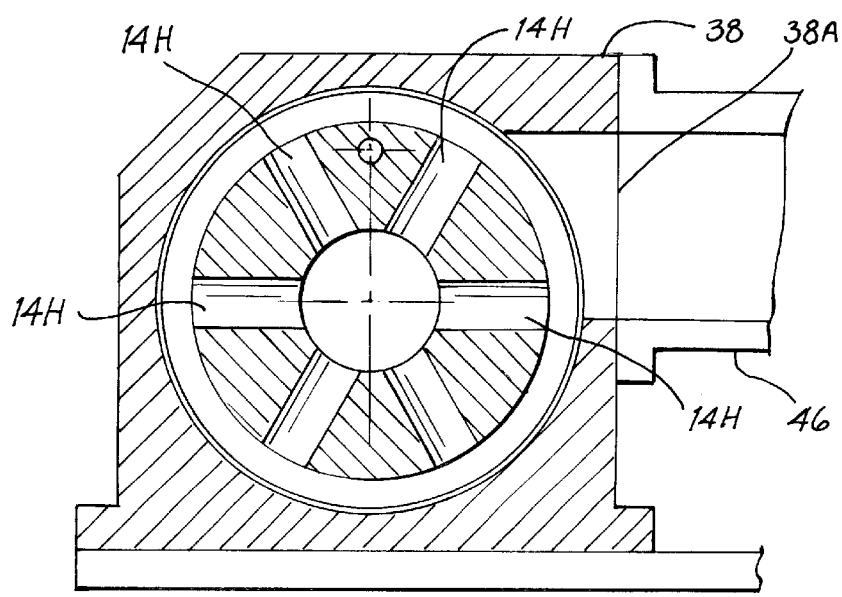
FIG. 5 is a cross-sectional view taken along lines 5—5 of FIG. 4 of one air coupling slip ring used in the housing assembly of the laser wire stripping apparatus of the present invention.
Figure 6:
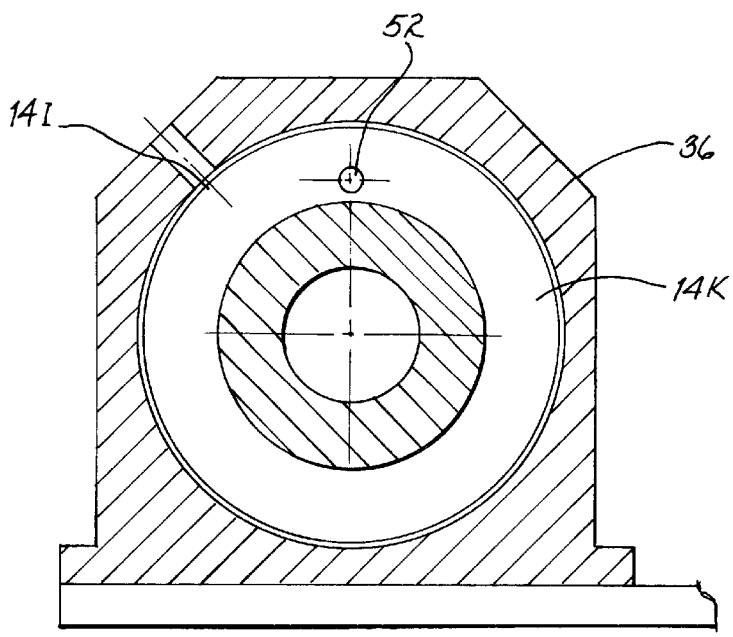
FIG. 6 is a cross-sectional view taken along lines 6—6 of FIG. 4 of a second air coupling slip ring used in the housing assembly of the laser wire stripping apparatus of the present invention.
Figure 7:
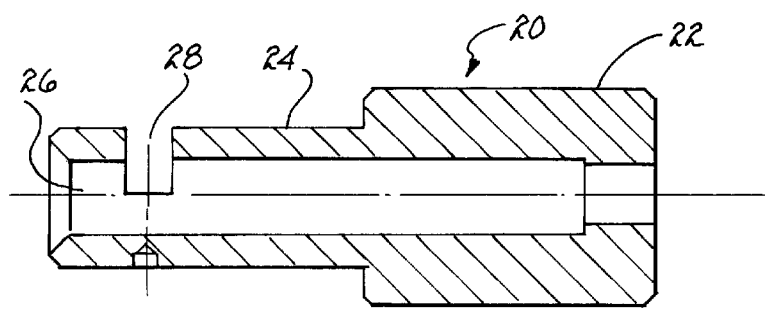
FIG. 7 is a cross-sectional view of a collet used in the channel assembly of the laser wire stripping apparatus of the present invention.

The collet 20 is held within the cylindrical cavity 14G by a securing device 21. In the embodiment depicted in FIG. 4, the securing device is a holding pin 21. When the collet 20 is inserted into the cylindrical cavity 14G, the holding pin 21 is moved upward to so that one end of the holding pin 21 is pushing into the collet 20. This effectively holds the collet 20 in position within the channel assembly 14. Thus, when the channel assembly 14 is rotated when the wire stripper 10 is activated, the collect 20 will stay in a fixed position relative to the channel assembly 14 instead of rotating within the cylindrical cavity 14G of the channel assembly 14.

The channel assembly 14 is supported within a housing assembly 12. However, the channel assembly 14 is free to rotate within the housing assembly 12. The rotation of the channel assembly 14 within the housing assembly 12 allows the light source to cut around the circumference of the wire in order to remove the insulation from a segment of the wire.

The housing assembly 12 also functions to form an airtight seal around a portion of the channel assembly 14. The airtight seal provides a positive pressure air section in the optical components (i.e., mirror 14E, and lens 14J) for keeping the optics free of smoke and particulates. The airtight seal also aids in removing debris generated by laser cutting the wire.

The housing assembly 12 uses a pair of end clamps 30. The end clamps 30 are used for holding the housing assembly 12 together. Both end clamps 30 have ball bearing races coupled thereto. The ball bearing races allow the channel assembly 14 to rotate within the housing assembly 12 when the housing assembly 12 is holding the channel assembly 14. Coupled to each end clamp 30 is a collar 32 and an o-ring 34. The collar 32 and o-ring 34 help to provide the air tight seal. The collar 32 and o-ring 34 assemblies are inserted into air coupling slip rings 36 and 38. On the other end of both gas coupling slip ring 36 and 38 is a slip ring 40. Each slip ring 40 is further coupled to a collar 42. Each piece of the housing assembly 12 has a circular void area. The circular void area is where the channel assembly 14 is positioned within the housing assembly 12.

One gas coupling slip ring 36 has an opening 36A drilled from the outer surface through the air coupling slip ring 36 and into the circular void area. The air coupling slip ring 36 is positioned so that the opening 36A is in alignment with the air intake passageway 14I of the channel assembly 14. The opening 36A will have a connector 36B. The connector 36B will allow a tubing 44 to be securely coupled to the opening 36A. The connector 36B may be any type of connection device. In the embodiment depicted in the Figures, the connector 36B is threaded. However, this should not be seen as to limit the scope of the present invention. The tubing 44 will inject a clean gas into the channel assembly 14. By injecting a clean gas into the channel assembly 14, the gas will pressurize the optical components (i.e., mirror 14E and lens 14J) thereby keeping the optical components free of contaminants. The gas will further blow any debris from the cutting area of the wire.

As stated above, the gas that is sent through the tubing 44 may be air, oxygen, dry nitrogen and the like. In the embodiment depicted in the Figures, the gas whether outside air or a compressed gas is sent through a filtration system 43 to remove any contaminants from the gas. The purified gas is then sent through the tubing to the channel assembly 14.

The other air coupling slip ring 38 has an exhaust opening 38A. The exhaust opening 38A is drilled from the outer surface through the gas coupling slip ring 38 and into the circular void area. The gas coupling slip ring 38 is positioned so that the air coupling slip ring 38 completely covers all of the ventilation passageways 14H of the channel assembly 14. The exhaust opening 38A will have a connector which will allow an exhaust tubing 46 to be securely coupled to the exhaust opening 38A. The exhaust tubing 46 will further be coupled to a vacuum system. The exhaust tubing 46 in combination with the vacuum system will draw out the smoke and other elements which are generated from the removal of the insulation.

OPERATION

A collet 20 is selected which has the proper size passageway 26 for the wire being used. The collet 20 is inserted into the channel assembly 14. The collet 20 is aligned in the cylindrical cavity 14G so that the opening 28 in the collet 20 is in alignment with the second passageway 14F of the channel assembly 14. This will allow the light source to travel through the channel assembly 14 into the collet 20 where the laser beam will cut the insulation from the wire inserted into the collet 20.

Once the collet 20 is properly aligned, the holding pin 21 is tightened to secure the collet 20 in place. The wire is then inserted into the passageway 26. The wire stripper 10 is then activated. The laser beam is generated from a light generating source (not shown). The laser beam may be programmed so as to only cut a certain material. Thus, the laser may be programmed to only remove the insulation from the wire and not harm the conductors.

The laser beam will travel through a passageway 50. The passageway 50 is coupled to the channel assembly 14. The laser beam enters the rectangular void 14A through one of the openings 14B. The laser beam is then reflected off of the mirrors 14C so that the laser beams exits the rectangular void 14A through the other opening 14B.

The laser beam is then sent through the passageway 14D through the focusing lens 14J. The laser beam is then reflected off of a mirror 14E to a second passageway 14F. The second passageway 14F connects the first passageway 14D with a cylindrical cavity 14G which is holding the collet 20. The laser beam will then enter the opening 28 in the collet 20 thus cutting the insulation from the wire.

The channel assembly 14 is rotated by a stepper motor (not shown). The stepper motor is coupled to the channel assembly via a belt 56. This causes the channel assembly 14 to slowly rotate thus allowing the laser beam to cut completely around the wire. The laser beam may further be used to cut a slit in the insulation of the wire. The slit would run perpendicular to the cut. This would allow one to easily remove the insulation from the wire.

During operation of the wire stripper 10, a purified gas will be injected into the channel assembly 14 via tubing 44. The gas will enter the housing assembly 12 via an opening 14I to fill chamber 14K. The gas will then enter the channeling via a opening 52. The gas will travel down a parallel passageway to the laser beam. By inserting a purified gas into the channel assembly 14, the gas will pressurize the optical components (i.e., mirror 14E and lens 14J) thereby keeping the optical components free of contaminants. The gas will further blow any debris from the cutting area of the wire.

An exhaust system will also aid in the removal of the smoke and debris from the channel assembly. The exhaust opening 38A in the exhaust coupling slip ring 38 is coupled to an exhaust tubing 46. The exhaust tubing 46 is further be coupled to a vacuum system. The exhaust tubing 46 in combination with the vacuum system will draw out the smoke and other elements which are generated from the removal of the insulation through the exhaust openings 14H into chamber 14L and out of the coupling ring 38 through 38A.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An assembly for use in a laser wire stripping apparatus comprising, in combination:
   a single piece channel assembly having a pathway for allowing a light source to travel through the channel assembly to a cylindrical cavity in the channel assembly;
   a collet having a passageway for insertion of a wire, the collet when inserted into the cylindrical cavity having an opening in alignment with the pathway for allowing the light source to remove insulation from the wire; and
   a housing assembly for holding the channel assembly and for allowing the channel assembly to rotate within the housing assembly, the housing assembly having an air insertion opening and an exhaust opening for clearing smoke and debris from the channel assembly.

2. An assembly for use in a laser wire stripping apparatus in accordance with claim 1 wherein the channel assembly further comprises:
   a first opening drilled through the channel assembly and into the cylindrical cavity and in alignment with the air insertion opening for allowing purified gas to be injected into the channel assembly; and
   a plurality of second openings drilled through the channel assembly and into the cylindrical cavity for allowing the smoke and debris to exit the channel assembly to the exhaust opening.

3. An assembly for use in a laser wire stripping apparatus in accordance with claim 1 wherein the channel assembly further comprises:
   a rectangular void area;
   a first opening in the rectangular void for allowing the light source to enter the rectangular void;
   a second opening in the rectangular void and in alignment with the pathway for allowing the light source to exit the rectangular void and into the pathway; and
   reflective surfaces positioned in the rectangular void for reflecting the light source out of the rectangular void.

4. An assembly for use in a laser wire stripping apparatus in accordance with claim 3 wherein the pathway comprises:
   a first passageway in alignment with the second opening in the rectangular void and runs along a majority of a length of the channel assembly; and
   a second passageway contiguous with the first passageway and having one end which enters the cylindrical void.

5. An assembly for use in a laser wire stripping apparatus in accordance with claim 4 further comprising a second reflective surface positioned in the first passageway for sending the light source down the second passageway.

6. An assembly for use in a laser wire stripping apparatus in accordance with claim 1 wherein the collet is a single piece cylindrical collet having a first diameter approximately that of a diameter of the cylindrical cavity.

7. An assembly for use in a laser wire stripping apparatus in accordance with claim 1 wherein the housing assembly comprises:
   a pair of clamps wherein one clamp is located on each end of the housing assembly for holding the housing assembly together;
   bearing surfaces coupled to each of the pair of clamps for allowing the channel assembly to rotate within the housing assembly;

a pair of sealing elements wherein one sealing element is coupled to each of the pair of clamps to provide for an air tight seal;

a first gas coupling slip ring coupled to one of the pair of sealing elements;

a second gas coupling slip ring coupled to a second one of the pair of sealing elements; and an air tight sealing member coupled to both the first gas coupling slip ring and the second gas coupling slip ring for providing an air tight seal between the first gas coupling slip ring and the second gas coupling slip ring;

wherein each of the pair of clamps, bearing surfaces, pair of sealing elements, first gas coupling slip ring, second gas coupling slip ring, and air tight sealing member has a centrally located circular void wherein the channel assembly is positioned within.

8. An assembly for use in a laser wire stripping apparatus in accordance with claim 7 wherein each of the pair of sealing elements comprises:

an o-ring for providing an air tight seal; and a collar for securing the slip ring in position.

9. An assembly for use in a laser wire stripping apparatus in accordance with claim 7 wherein the air tight sealing member comprises:

a first slip ring coupled to the first gas coupling slip ring for providing an air tight seal;

a second slip ring coupled to the second gas coupling slip ring for providing an air tight seal; and a collar for securing the first slip ring and the second slip ring in position.

10. An assembly for use in a laser wire stripping apparatus in accordance with claim 7 wherein the first gas coupling slip ring has the air insertion opening drilled through the first gas coupling slip ring into the circular void of the first gas coupling slip ring for allowing purified gas to be inserted into the housing assembly.

11. An assembly for use in a laser wire stripping apparatus in accordance with claim 7 wherein the second gas coupling slip ring has the exhaust opening drilled through the second gas coupling slip ring into the circular void of the second gas coupling slip ring for clearing smoke and debris from the channel assembly.

12. A laser wire stripping apparatus comprising, in combination:

a housing;

a laser generator for generating a light source;

a single piece channel assembly having a pathway for allowing the light source to travel through the channel assembly to a cylindrical cavity in the channel assembly;

a collet having a passageway for insertion of a wire, the collet when inserted into the cylindrical cavity having an opening in alignment with the pathway for allowing the light source to remove insulation from the wire; and a housing assembly for holding the channel assembly and for allowing the channel assembly to rotate within the housing assembly, the housing assembly having a gas insertion opening and an exhaust opening for clearing smoke and debris from the channel assembly.

13. A laser wire stripping apparatus in accordance with claim 12 further comprising a rotation mechanism coupled to the channel assembly for rotating the channel assembly around the wire so the light source will remove the insulation from the wire.

14. A laser wire stripping apparatus in accordance with claim 13 wherein the rotation mechanism comprises:

a motor; and a belt coupled to the motor and the channel assembly.

15. A laser wire stripping apparatus in accordance with claim 12 further comprising a gas source coupled to the air insertion opening of the housing assembly for injecting purified gas into the channel assembly.

16. A laser wire stripping apparatus in accordance with claim 12 further comprising a vacuum system coupled to the exhaust opening of the housing assembly for clearing smoke and debris from the channel assembly.

17. A laser wire stripping apparatus in accordance with claim 12 wherein the channel assembly further comprises:

a first opening drilled through the channel assembly and into the cylindrical cavity and in alignment with the gas insertion opening for allowing purified gas to be injected into the channel assembly; and a plurality of second openings drilled through the channel assembly and into the cylindrical cavity for allowing the smoke and debris to exit the channel assembly to the exhaust opening.

18. A laser wire stripping apparatus in accordance with claim 12 wherein the channel assembly further comprises:

a rectangular void area;

a first opening in the rectangular void for allowing the light source to enter the rectangular void;

a second opening in the rectangular void and in alignment with the pathway for allowing the light source to exit the rectangular void and into the pathway; and reflective surfaces positioned in the rectangular void for reflecting the light source out of the rectangular void.

19. A laser wire stripping apparatus in accordance with claim 18 wherein the pathway comprises:

a first passageway in alignment with the second opening in the rectangular void and runs along a majority of a length of the channel assembly; and a second passageway contiguous with the first passageway and having one end which enters the cylindrical void.

20. A laser wire stripping apparatus in accordance with claim 19 further comprising a second reflective surface positioned in the first passageway for sending the light source down the second passageway.

21. A laser wire stripping apparatus in accordance with claim 12 wherein the collet is a single piece cylindrical collet having a first diameter approximately that of a diameter of the cylindrical cavity.

22. A laser wire stripping apparatus in accordance with claim 12 wherein the housing assembly comprises:

a pair of clamps wherein one clamp is located on each end of the housing assembly for holding the housing assembly together;

bearing surfaces coupled to each of the pair of clamps for allowing the channel assembly to rotate within the housing assembly;

a pair of sealing elements wherein one sealing element is coupled to each of the pair of clamps to provide for an air tight seal;

a first gas coupling slip ring coupled to one of the pair of sealing elements;

a second gas coupling slip ring coupled to a second one of the pair of sealing elements; and an air tight sealing member coupled to both the first air coupling slip ring and the second air coupling slip ring for providing an air tight seal between the first gas coupling slip ring and the second gas coupling slip ring;

wherein each of the pair of clamps, bearing surfaces, pair of sealing elements, first gas coupling slip ring, second gas coupling slip ring, and air tight sealing member has a centrally located circular void wherein the channel assembly is positioned within.

23. A laser wire stripping apparatus in accordance with claim 22 wherein each of the pair of sealing elements comprises:

an o-ring for providing an air tight seal; and a collar for securing the slip ring in position.

24. A laser wire stripping apparatus in accordance with claim 22 wherein the air tight sealing member comprises:

a first slip ring coupled to the first gas coupling slip ring for providing an air tight seal;

a second slip ring coupled to the second gas coupling slip ring for providing an air tight seal; and a collar for securing the first slip ring and the second slip ring in position.

25. A laser wire stripping apparatus in accordance with claim 22 wherein the first gas coupling slip ring has the gas insertion opening drilled through the first gas coupling slip ring into the circular void of the first gas coupling slip ring for allowing purified gas to be inserted into the housing assembly.

26. A laser wire stripping apparatus in accordance with claim 22 wherein the second gas coupling slip ring has the exhaust opening drilled through the second gas coupling slip ring into the circular void of the second gas coupling slip ring for clearing smoke and debris from the channel assembly.

* * * * *